United States Patent
Sauvageau et al.

(10) Patent No.: US 10,640,160 B2
(45) Date of Patent: May 5, 2020

(54) PROGRESSIVE DAMPING SYSTEM FOR A TRACK SYSTEM

(71) Applicant: SOUCY INTERNATIONAL INC., Drummondville (CA)

(72) Inventors: Yves Sauvageau, Drummondville (CA); Jonathan Pellerin, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 277 days.

(21) Appl. No.: 15/565,440

(22) PCT Filed: Apr. 11, 2016

(86) PCT No.: PCT/CA2016/050418
§ 371 (c)(1),
(2) Date: Oct. 10, 2017

(87) PCT Pub. No.: WO2016/161527
PCT Pub. Date: Oct. 13, 2016

(65) Prior Publication Data
US 2018/0118286 A1 May 3, 2018

Related U.S. Application Data

(63) Continuation-in-part of application No. 15/515,197, filed as application No. PCT/CA2015/050978 on Sep. 29, 2015, now Pat. No. 10,343,734.
(Continued)

(51) Int. Cl.
*B62D 55/112* (2006.01)
*B60G 17/08* (2006.01)
(Continued)

(52) U.S. Cl.
CPC ........ *B62D 55/112* (2013.01); *B60G 17/0165* (2013.01); *B60G 17/056* (2013.01);
(Continued)

(58) Field of Classification Search
CPC ....... B62D 55/112; F16F 9/061; F16F 9/3292; F16F 9/065; F16F 9/50; F16F 2232/08;
(Continued)

(56) References Cited

U.S. PATENT DOCUMENTS

| 1,255,218 A | 2/1918 | Paulsen |
| 1,806,819 A | 5/1931 | Paulsen |

(Continued)

FOREIGN PATENT DOCUMENTS

| CA | 2140600 A1 | 6/1996 |
| CA | 2188103 A1 | 4/1997 |

(Continued)

OTHER PUBLICATIONS

International Search Report from PCT/CA2015/050978 dated Dec. 22, 2015, Zarifa, Adeeb.
(Continued)

*Primary Examiner* — Vishal R Sahni
(74) *Attorney, Agent, or Firm* — BCF LLP

(57) ABSTRACT

The present invention generally relates to vehicle and machinery in agriculture, construction, forestry, mining and powersport. It further generally relates to track systems and traction assemblies used with such vehicles. The track system comprises a drive wheel and a plurality of idler wheels mounted on a support frame. At least one of the plurality of wheels is operatively mounted on the support frame via a damping system adapted to provide a damping value dynamically varying as a function of the load applied. Track systems do not benefit from the damping provided by the layer of air within the tires. The disclosed damping
(Continued)

system has the objective to overcome one this drawback by providing a smooth ride for tracked vehicles. The damping system comprises a cylinder fluidly connected to a reservoir. Damping ratio is varied by varying a flow circulating area between the cylinder and the reservoir.

8 Claims, 13 Drawing Sheets

Related U.S. Application Data

(60) Provisional application No. 62/146,140, filed on Apr. 10, 2015, provisional application No. 62/146,113, filed on Apr. 10, 2015, provisional application No. 62/057,110, filed on Sep. 29, 2014.

(51) Int. Cl.

| | |
|---|---|
| *B62D 55/15* | (2006.01) |
| *B62D 55/04* | (2006.01) |
| *B62D 55/12* | (2006.01) |
| *B62D 49/06* | (2006.01) |
| *B60G 17/056* | (2006.01) |
| *B60G 17/0165* | (2006.01) |
| *F16F 9/346* | (2006.01) |
| *F16F 9/512* | (2006.01) |
| *F16F 9/06* | (2006.01) |

(52) U.S. Cl.
CPC ......... *B60G 17/08* (2013.01); *B62D 49/0635* (2013.01); *B62D 55/04* (2013.01); *B62D 55/12* (2013.01); *B62D 55/15* (2013.01); *F16F 9/065* (2013.01); *F16F 9/346* (2013.01); *F16F 9/512* (2013.01); *B60G 2202/154* (2013.01); *B60G 2300/32* (2013.01); *B60G 2400/25* (2013.01); *B60G 2500/11* (2013.01)

(58) Field of Classification Search
CPC ............. F16F 2222/12; F16F 2228/066; F16F 2230/08; F16F 2230/18
See application file for complete search history.

(56) References Cited

U.S. PATENT DOCUMENTS

| | | | |
|---|---|---|---|
| 1,980,276 A | 11/1934 | Adolphe | |
| 2,019,654 A | 11/1935 | Valentine | |
| 2,041,599 A | 5/1936 | David | |
| 2,093,456 A | 9/1937 | Knox | |
| 2,386,620 A | 10/1945 | Graham | |
| 2,442,354 A | 6/1948 | Gordon et al. | |
| 2,458,549 A | 1/1949 | Bachman et al. | |
| 2,467,947 A | 4/1949 | Skelton | |
| 2,496,136 A | 1/1950 | Smith | |
| 2,561,901 A | 7/1951 | Bachman et al. | |
| 2,612,742 A | 10/1952 | Heth | |
| 2,998,998 A | 9/1961 | Hyler et al. | |
| 3,168,168 A | 2/1965 | Chorkey | |
| 3,510,117 A | 5/1970 | Scholin et al. | |
| 3,598,206 A | 8/1971 | Hennells | |
| 3,603,423 A | 9/1971 | Schoonover | |
| 3,693,767 A | 9/1972 | Johnson | |
| 3,706,481 A | 12/1972 | Kramer | |
| 3,774,708 A | 11/1973 | Purcell et al. | |
| 3,841,424 A | 10/1974 | Purcell | |
| 3,938,606 A | 2/1976 | Yancey | |
| 4,044,865 A | 8/1977 | Tourunen | |
| 4,519,654 A | 5/1985 | Satzler | |
| 4,712,469 A | 12/1987 | Hesse | |
| 4,840,437 A | 6/1989 | Henry et al. | |
| 4,893,883 A | 1/1990 | Satzler | |
| 4,923,257 A | 4/1990 | Purcell | |
| 5,316,381 A | 5/1994 | Isaakson et al. | |
| 5,340,205 A | 8/1994 | Nagorcka | |
| 5,372,212 A | 12/1994 | Davis | |
| 5,452,949 A | 9/1995 | Kelderman | |
| 5,566,773 A | 10/1996 | Gersmann | |
| 5,997,109 A | 12/1999 | Kautsch | |
| 6,003,888 A | 12/1999 | Godbersen | |
| 6,244,613 B1 | 6/2001 | Renger | |
| 6,334,496 B1 | 1/2002 | Hiraki et al. | |
| 6,401,847 B1 | 6/2002 | Lykken | |
| 6,432,010 B1 | 8/2002 | Palonis et al. | |
| 6,543,861 B1* | 4/2003 | Kahle .................... B62D 55/04 305/143 |
| 6,974,002 B2 | 12/2005 | Heideman | |
| 7,556,130 B2 | 7/2009 | Lamoureux et al. | |
| 7,597,161 B2 | 10/2009 | Brazier | |
| 8,083,242 B2 | 12/2011 | Brazier | |
| 8,291,993 B2 | 10/2012 | Juncker | |
| 8,469,124 B2 | 6/2013 | Allaire | |
| 8,640,797 B2 | 2/2014 | Allaire | |
| 8,763,716 B2 | 7/2014 | Rosenbloom | |
| 8,764,129 B2 | 7/2014 | Simula et al. | |
| 10,124,843 B2 | 11/2018 | Sauvageau et al. | |
| 2004/0026994 A1 | 2/2004 | Verheye et al. | |
| 2004/0032107 A1 | 2/2004 | Timoney et al. | |
| 2004/0099451 A1 | 11/2004 | Nagorcka et al. | |
| 2005/0067239 A1 | 3/2005 | Bauer et al. | |
| 2007/0029871 A1 | 2/2007 | Wake et al. | |
| 2007/0087876 A1 | 4/2007 | Ward et al. | |
| 2010/0237691 A1 | 9/2010 | Busley et al. | |
| 2011/0315459 A1* | 12/2011 | Zuchoski ............ B60W 50/082 180/9.21 |
| 2012/0222908 A1 | 9/2012 | Mangum | |
| 2012/0242121 A1 | 9/2012 | Ulrich | |
| 2012/0242141 A1 | 9/2012 | Bessette et al. | |
| 2012/0242142 A1* | 9/2012 | Kautsch ................ B62D 55/02 305/142 |
| 2012/0286565 A1 | 11/2012 | Marchildon et al. | |
| 2013/0119753 A1 | 5/2013 | Pare et al. | |
| 2014/0125118 A1* | 5/2014 | Nagorcka ............. B62D 55/14 305/125 |
| 2015/0266524 A1 | 9/2015 | Rackow et al. | |
| 2016/0068205 A1* | 3/2016 | Hellholm ............ B62D 55/112 180/9.54 |
| 2017/0225727 A1 | 8/2017 | Sauvageau et al. | |
| 2018/0086397 A1* | 3/2018 | Sauvageau ........... B62D 55/112 |

FOREIGN PATENT DOCUMENTS

| | | |
|---|---|---|
| CA | 2668234 A1 | 12/2009 |
| CA | 2832180 A1 | 5/2014 |
| DE | 29509006 U1 | 8/1995 |
| DE | 19919959 A1 | 11/2000 |
| DE | 102014003964 A1 | 9/2015 |
| EP | 2727803 A2 | 5/2014 |
| EP | 2921378 A2 | 1/2016 |
| GB | 570190 A | 6/1945 |
| GB | 2393696 A | 4/2004 |
| JP | 07142108 A | 6/1995 |
| WO | 2011154533 A1 | 12/2011 |
| WO | 2016049760 A1 | 4/2016 |
| WO | 2016161527 A1 | 10/2016 |

OTHER PUBLICATIONS

English abstract of DE 102014003964 retrieved from Espacenet on Mar. 29, 2017.
English abstract of JPH07142108 retrieved from Espacenet on Mar. 29, 2017.
English abstract of DE 19919959 retrieved from Espacenet on Mar. 29, 2017.
English abstract of EP 15150462 retrieved from Espacenet on Mar. 29, 2017.
English abstract of EP 2921378 retrieved from Espacenet on Mar. 29, 2017.
International Search Report from PCT/US2017/026701, dated Jun. 27, 2017, Blaine R. Copenheaver.

(56) References Cited

OTHER PUBLICATIONS

International Search Report from PCT/CA2016/050419 dated Jun. 22, 2016, Robert Gruber.
International Search Report from PCT/CA2016/050418 dated Jun. 22, 2016, Robert Gruber.
U.S. Appl. No. 15/720,316, filed Sep. 29, 2017.
U.S. Appl. No. 15/565,440, filed Apr. 11, 2016.
U.S. Appl. No. 15/565,450, filed Apr. 11, 2016.
U.S. Appl. No. 15/784,024, filed Oct. 13, 2017.
U.S. Appl. No. 15/784,032, filed Oct. 13, 2017.
Supplementary International Search Report from PCT/US2017/026701, dated Aug. 16, 2019, Szaip, Andras.

\* cited by examiner

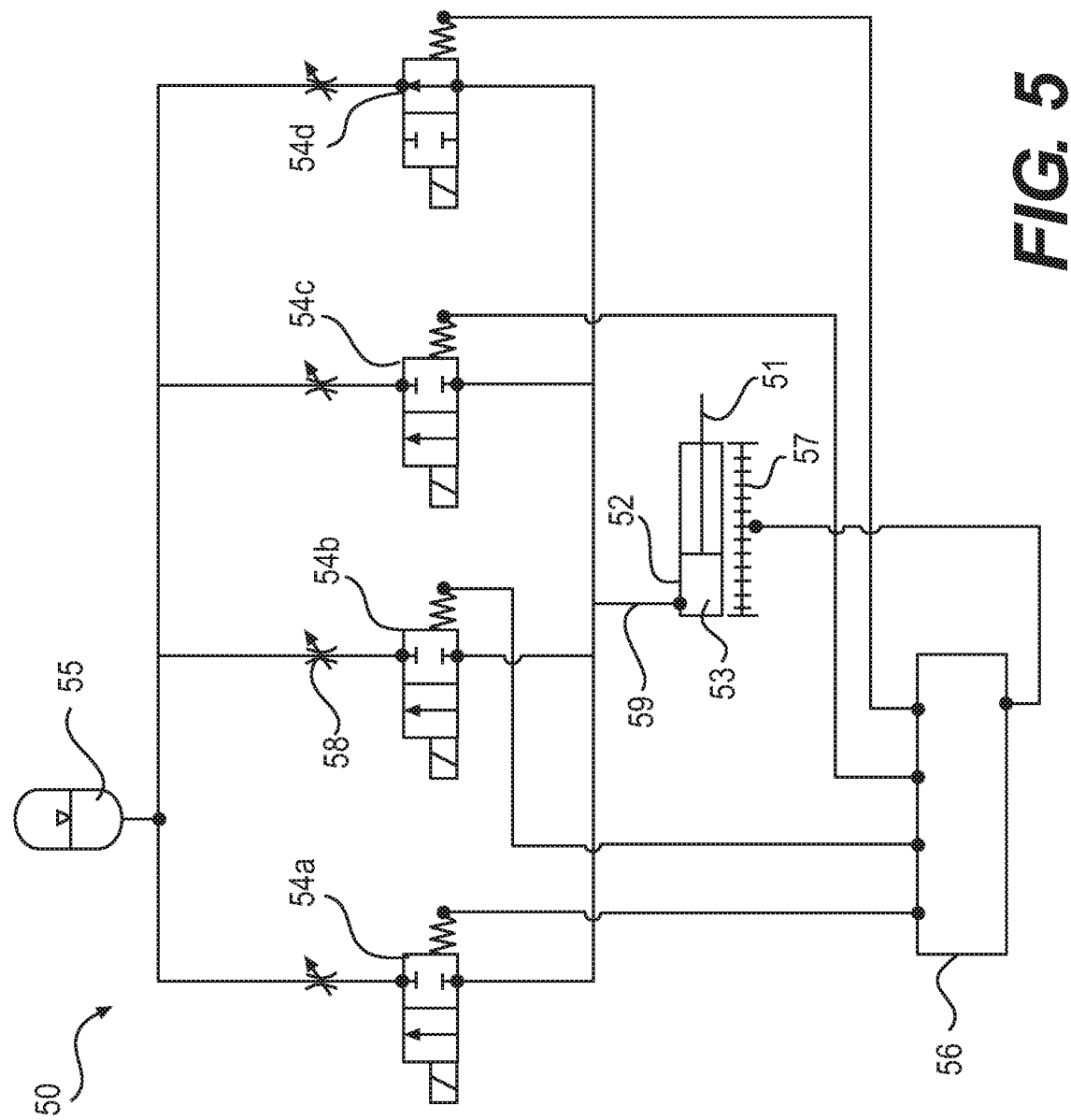

PROGRESSIVE DAMPING SYSTEM FOR A TRACK SYSTEM

CROSS-REFERENCE TO RELATED APPLICATIONS

The present patent application claims the benefits of priority of commonly assigned Patent Application No. 62/146,140, entitled "Progressive damping system for a track system" and filed at the United States Patent and Trademark Office on Apr. 10, 2015, the content of which is incorporated herein by reference.

FIELD OF THE INVENTION

The present invention generally relates to track systems for vehicle and machinery in agriculture, construction, forestry, mining and powersport which uses suspension having damping capabilities. More particularly, the present invention may also relate to track systems and traction assemblies which comprise a progressive damping system.

BACKGROUND OF THE INVENTION

Traction and flotation have always been important issues with farming and construction vehicles. Having a vehicle mounted on track systems assures lower ground pressure, better traction and better use of the available power. This is particularly important when the vehicle is operated on soft ground condition or when increased traction effort is required.

One of the challenges of track systems is to provide a smooth ride to the operator without regard to the parameters of the vehicle, such as the load.

One of the drawbacks of existing track systems is the comfort. One of the reasons is that existing track systems do not benefit from the damping provided by the layer of air within the tires.

Another drawbacks of the existing track systems is the adaptation of the suspension elements to the variation of load or of charge of the vehicle. Indeed, when load or charge is increased on the vehicle, the oscillation of the load with regard to the track system shall be greatly affected. As an example, the oscillation of an harvester comprising track systems after hitting an obstacle on the ground may be greatly increased when loaded with harvesting products.

Hence, there is a need for track systems which can preferably provide comfort and limit the oscillation of a tracked vehicle while maintaining the advantages of track system.

SUMMARY OF THE INVENTION

The shortcomings of the prior art are generally mitigated by the track assembly herein described that maximizes road comfort. The track assembly comprises a sprocket, an optional final drive, an optional one piece main frame, an optional front split frame, an optional rear split frame, at least one secondary pivoting assembly, at least one idler wheel, a plurality of sets of support wheels, at least one shock absorber, a spring, such as but not limited to mechanical, pneumatic or hydraulic springs, a track band, frame components, etc. The track assembly comprising these components is assembled in particular configurations for the track assembly as a whole to minimize the vibration that are communicated through the assembly to the vehicle and accordingly to the vehicle operator.

One aspect of the present invention is to maintain a constant level of comfort and performance as the load of the agriculture machinery varies during normal working conditions.

A progressive or different steps damping rate with or without progressive spring are used to maintain suspension performance under different load conditions. Accordingly, a proper damping ratio can be achieved across all cylinder stroke. The damping rate equals can be calculated using an appropriate equation.

This invention allows using a complete passive system on a track vehicle and having a near optimum damping value, without any intervention of the vehicle operator or electric automate or any connection between vehicle and track system to adjust the damping value. This can also works with semi-active and active suspension system. Only the stroke position adjusts the damping value. The damping value change could be made, for example, by adding progressive groove opening onto cylinder surface to restrict/unrestrict hydraulic flow.

Another option with the present solution would be using step increments damping value change or by using solenoid valves to control the flow of fluid escaping from the cylinder. This would not give a constant damping ratio over the stroke but would have the advantage to respect a damping ratio range. A step adjusting could be made, as an example, by using different oil tubing having a different volume so that each tube that can be closed or opened depending of cylinder stroke position.

In one aspect of the invention, a track system for a vehicle is disclosed, the track system comprising a drive wheel configured to be mounted to the vehicle, a support frame comprising a damping system, the damping system being adapted to provide a damping value dynamically varying as a function of load applied on the track system, front and rear idler wheels pivotally mounted to the support frame, road wheels pivotally mounted to the support frame and an endless track disposed about the drive wheel, the front and rear idler wheels, and the road wheels, the endless track defining an overall perimeter of the track system.

In another aspect of the invention, the track system as described herein above further comprises a damping system being fluid-based, the damping system comprising a reservoir fluidly connected to a damping element, the damping system being configured to vary the flow of fluid between the damping element and the reservoir as a function of the load applied on the damping element. The damping element comprises a hollow portion having a closed end and being fluidly connected to the reservoir; a piston, the piston being adapted to slidingly move inside the hollow portion. As the piston slidingly moves inside the hollow piece toward the closed end, fluid is pushed from the hollow piece to the reservoir, and flow of fluid circulating between the hollow piece and the reservoir is reduced thereby increasing a damping force.

In other aspect of the invention, the damping system may further comprises a plurality of fluid connectors, the plurality of fluid connectors being fluidly connected between the hollow portion and the reservoir, the plurality of fluid connectors defining a flow circulating area, wherein the flow circulating area is reduced thereby increasing a damping force when the piston moves towards the closed end of the cylinder.

The flow of fluid of each one of the plurality of pipes may be successively reduced by the piston as the piston moves towards the closed end of the hollow portion.

In another aspect of the invention, the damping system may further comprises a controller configured to receive a signal from the mean for measuring position of the piston and/or to send a control signal to the active fluid flow control mean based on the received signal from the mean for measuring position of the piston.

The control signal may allow the active fluid flow control mean to block or limit the flow of fluid between the hollow portion and the reservoir.

The mean for measuring position of the piston may a linear variable differential transformer (LVDT) and/or may be integrated to the hollow portion.

The invention is further directed to a method for varying the damping value of a damping system of a track system, the method comprising varying the flow of a fluid between a hollow portion of a suspension element and a reservoir in relation to movement of a piston within the hollow portion to provide a damping value dynamically varying as a function of load applied on the track system.

In a further aspect of the invention, the method may further comprise reducing the flow of the fluid as load increases on the track system and/or increasing the flow of the fluid as load decreases on the track system.

In another aspect of the invention, the method may further comprise measuring the position of the piston in relation to length of the hollow portion and/or modifying the flow of the fluid based on the measured position of the piston.

The method may further comprise communicating a control signal to an active fluid flow control mean configured to vary the flow based on the control signal.

In yet another aspect of the invention, the method may further comprise communicating the measured position to a controller configured to communicate the control signal to the active fluid flow control mean.

In embodiments where the active fluid flow control mean is one or more solenoid valves, the method may further comprises controlling one or more solenoid valves to vary the flow of fluid between the cylinder and the reservoir.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 5 is a schematic diagram of an embodiment of a damping system for a track system using solenoid valves for varying the damping value of the damping system of a track system.

DETAILED DESCRIPTION OF THE PREFERRED EMBODIMENT

A novel progressive damping system for a track system will be described hereinafter. Although the invention is described in terms of specific illustrative embodiments, it is to be understood that the embodiments described herein are by way of example only and that the scope of the invention is not intended to be limited thereby.

Figure 1:
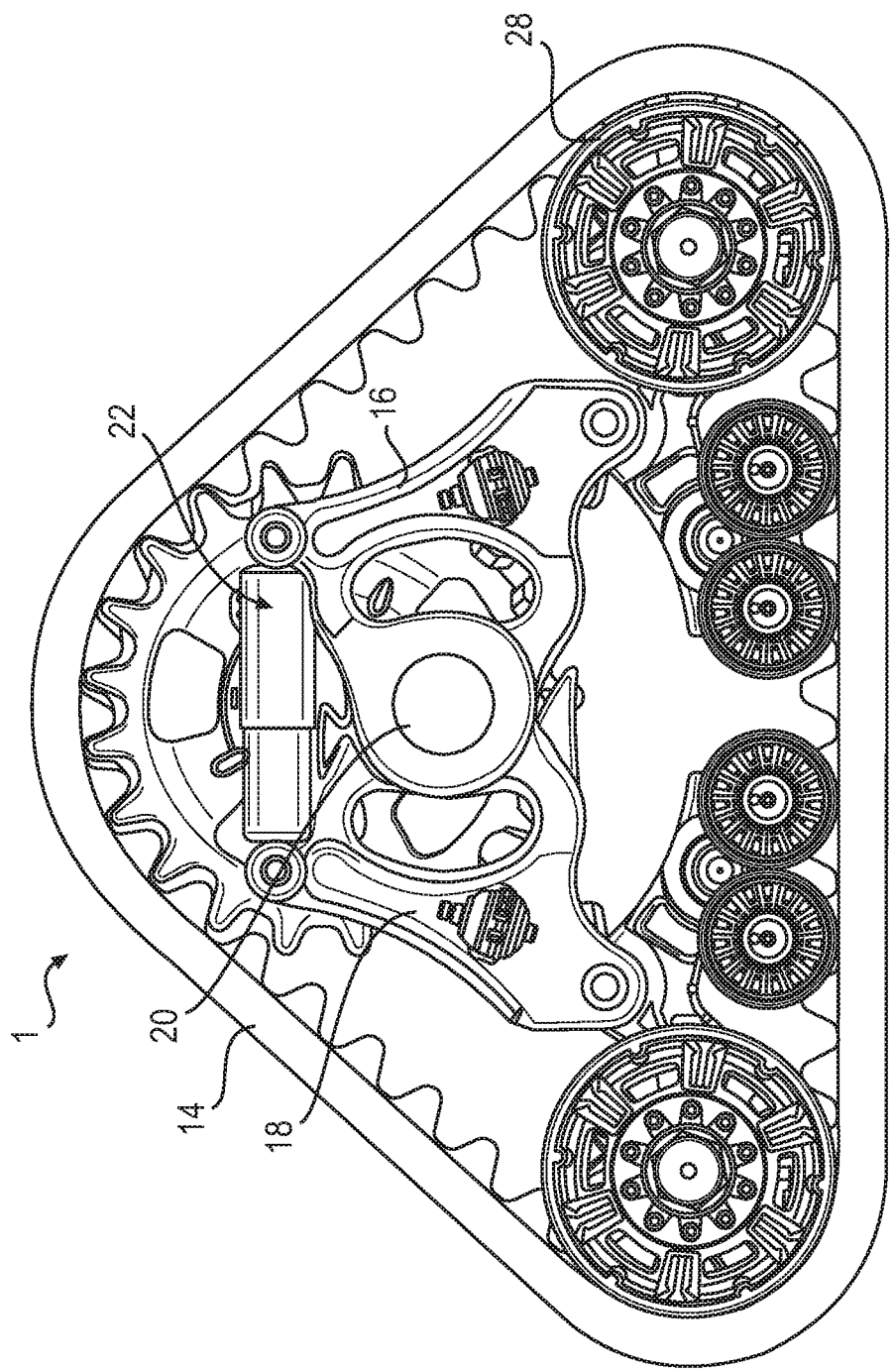
FIG. 1 is a side view of a track assembly having a split frame comprising a damping system in accordance with the principles of the present invention.

Referring to FIG. 1, an exemplary track system 1 (a.k.a. track assembly) is shown. The track system 1 is well adapted for an agricultural vehicle such as a tractor, a harvester or any utility cart or trailer. Still, the track system 1 could be mounted to other types of vehicles such as, but not limited to, all-terrain vehicle (ATV), utility-terrain vehicles (UTV), side-by-side vehicles (SSV), and other similar vehicles. The vehicle may be used for different purposes, including agriculture, construction, forestry, mining and powersport. The track system 1 typically comprises a sprocket wheel (not shown) configured to be mounted to the wheel axle or hub (not shown) of a vehicle such as an harvester (not shown), a support frame 16 and 18, at least two idler wheels 28, and an endless traction band 14 disposed around the sprocket wheel and the support frame 16 and 18.

Figure 2:
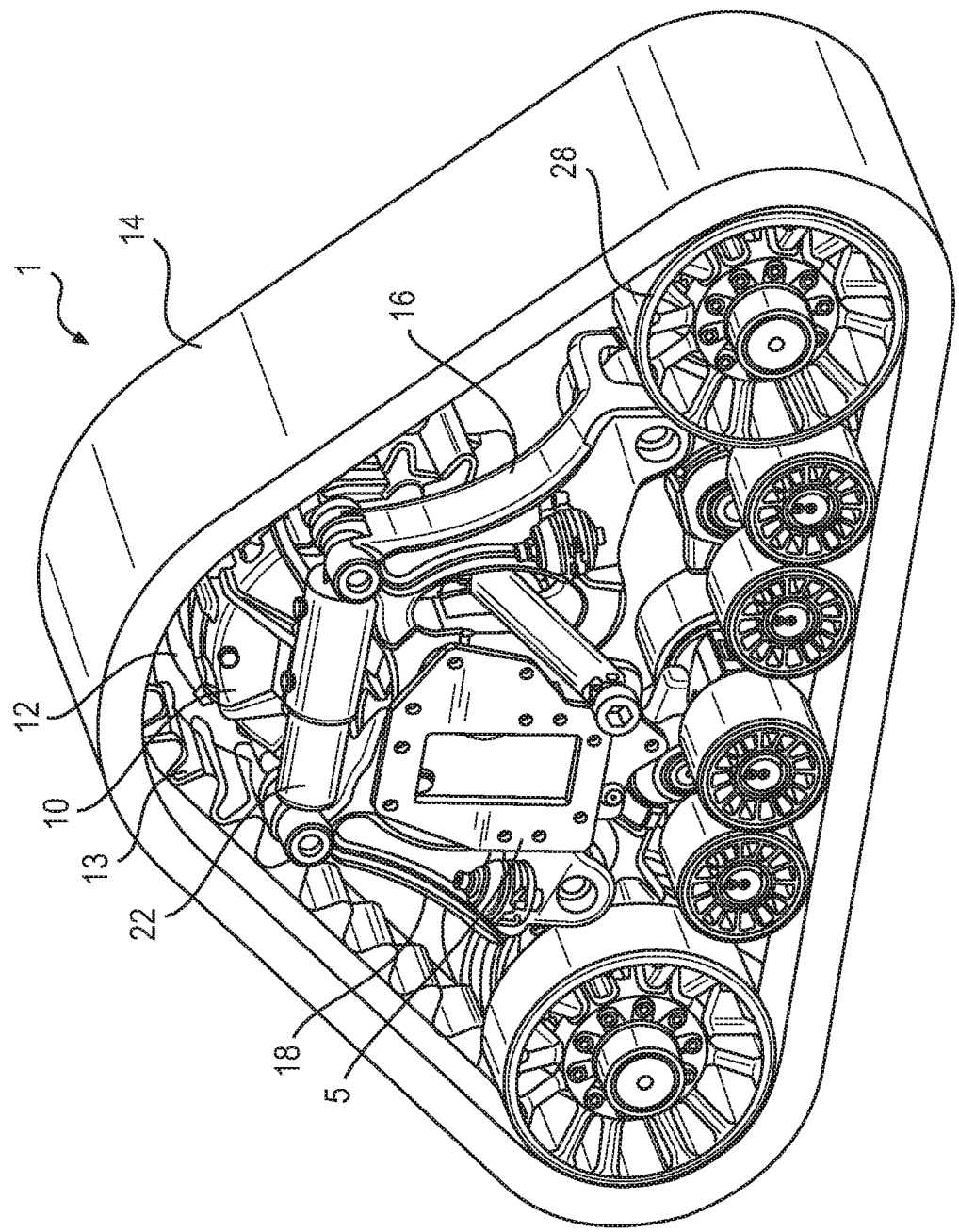
FIG. 2 is a side perspective view of a track assembly comprising a variable damping system.

Still referring to FIG. 2, the sprocket wheel 12 generally comprises a plurality of generally evenly spaced sprocket teeth 13 located at the periphery thereof. The sprocket teeth 13 are configured to drivingly engage the drive lugs of the traction band 14.

The sprocket wheel 12 typically comprises a circular disk having formed therein first circularly disposed apertures configured to reflect the bolt pattern of the final drive 10 or, in other embodiments, of the vehicle axle/hub 5 such as to receive the mounting bolts thereof, and second circularly disposed apertures configured to receive the fastening bolts of the sprocket wheel 12 and of the flange of the shaft which will be described in more details below. Other configuration of the sprocket wheel may be used.

Understandably, in some other embodiments, the sprocket wheel 12 could be unitary or the sprocket wheel 12 could have more than two sections. In addition, in still other embodiments, the disk could be unitary with the sprocket wheel 12 or could even be omitted.

In a preferred embodiment, the support frame 16 and 18 comprises two portions, a front split frame 16 and a rear split frame 18 such as, but not limited to, a track system as disclosed in the patent application published under no. WO 2016/049760. In such an embodiment, the front split frame 16 and the rear split frame 18 are pivotably coupled using a damper system or suspension element 22, such as a shock or absorbing cylinder. The damper system 22 absorbs the vibrations undergone by the track system 1 and provides progressive dampening based on the level of retraction or expansion of the damping system. Such progressive dampening allows the track system to dynamically adapt to variation of the load of the harvester or vehicle. As the load of such a vehicle may substantially vary, the progressive or variable damping system aims at generally maintaining the performance or comfort of the track system even if the load varies. In some embodiments, the damping system or suspension element 22 may further comprise a spring, such as a coil spring, to modulate the rebound of the damping system with or without using a hydraulic accumulator or reservoir.

The present embodiment allows the configuration of the support frame 16 and 18 of the track system 1 to adapt to the current load conditions of the vehicle.

In a preferred embodiment, each split frame portion 16 and 18 is connected to the other by the variable damper system 22. The variable damper system 22 is adapted to control and/or at least to limit the rotational movement between both split frame portions 16 and 18 and is adapted to restore the default positions of the split frames 16 and 18.

Such variable damper component allows to dynamically adapt the parameters of the suspension system as a function of the force absorbed by the track system. As an example, the said force may be transmitted to the track system 1 by a variation or imperfection of the terrain, by a cart or trailer attached to the vehicle or when grain or other material is added or removed on the vehicle during operation, such as grain harvested by an harvester during operations. In such an embodiment, the suspension component is configured to react to a change of the initial conditions, such as the change of the load or to the track system hitting an obstacle. Such reaction comprises directly or instantly varying the damping value of the suspension system according to the current level of compression of the suspension element. Typically, the damping value of the suspension system shall increases as the compression of the suspension element increases.

Figure 3:
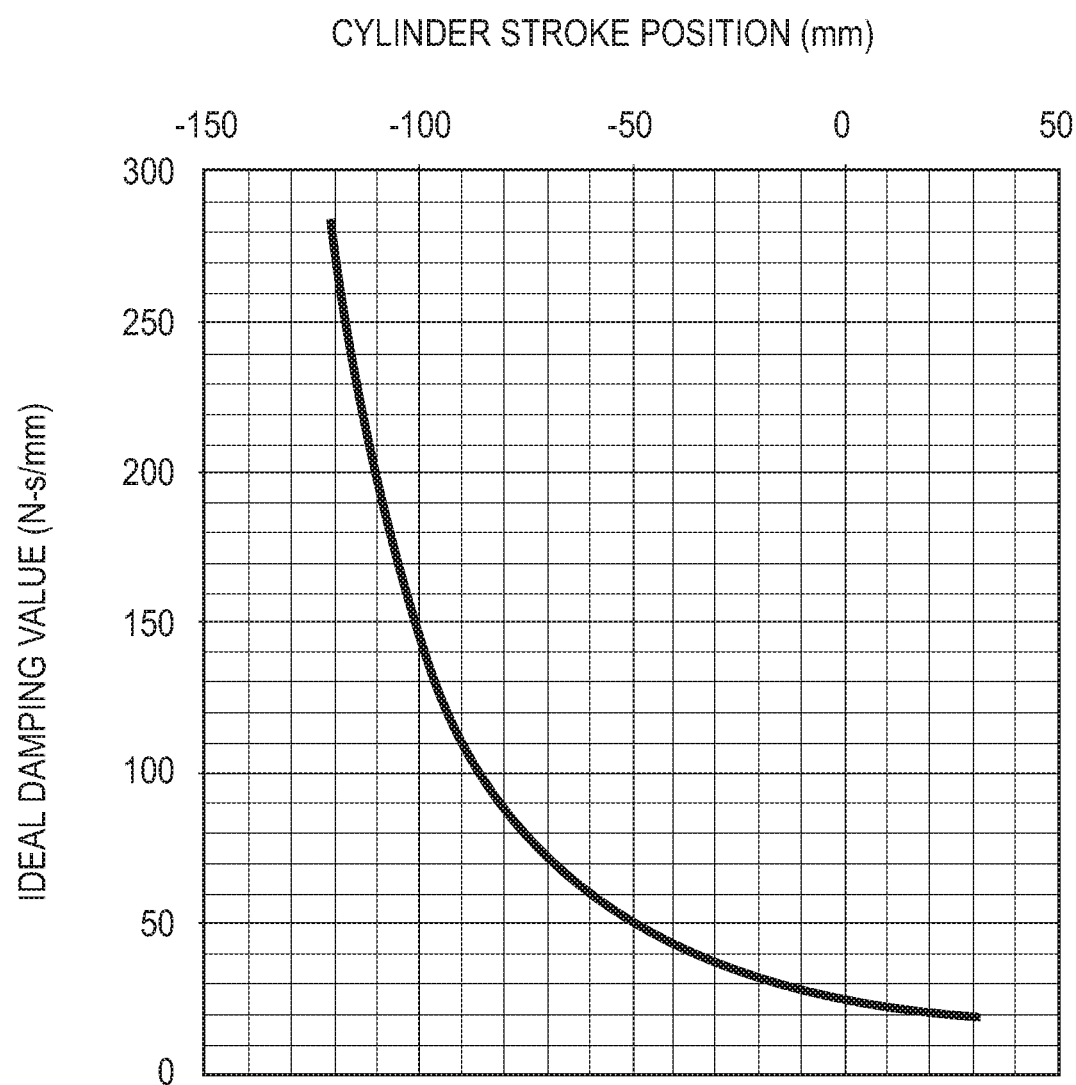
FIG. 3 is an exemplary diagram of cylinder stroke position values in relation to ideal damping value for specific conditions and/or specific vehicle.

Now referring to FIG. 3, an exemplary diagram presents ideal required damping value as a function of the stroke position of the piston with regard to the cylinder (mm) of a suspension element. Thus, a track system comprising a suspension system in accordance with the present disclosure aims at having progressive damping characteristics being as closer as possible to the ideal damping value as shown in FIG. 3 for a damping rate of 0.4. The required/ideal damping rate must be calculated for specific vehicles or terrain profile and/or conditions.

As an example, the damping rate may be calculated according to the following equation:

$$\text{Damping Rate} = \frac{\text{Damping Value}\left(\frac{N \cdot s}{mm}\right)}{2 \cdot \sqrt{\text{Spring Rate}\left(\frac{N}{mm}\right) \cdot \text{Weight}(T)}}$$

In one embodiment, the dynamic variable damping system may be configured as a passive system. Such configuration allows the system to adapt dynamically or in real-time without any intervention by the vehicle operator, without any usage of an electric automate or without any communication means transferring the damping value between the vehicle and track system 1.

Now referring to FIGS. 4A to 4D and 10, the fluid circuit of an embodiment of a damping system 40 using hydraulic suspension element to be installed on a track system for a vehicle is illustrated at different levels of compression of the suspension element. The damping system 40 of such an embodiment generally comprises a hydraulic suspension element 46. The hydraulic suspension element generally comprises a plunger 41 adapted to sealingly or hermetically move within the interior portion 43 of a cylinder 42.

In the present embodiment, the interior portion 43 is configured to comprise an open end and a closed end. The plunger 41 is inserted through the open end. Understandably, any other type of hydraulic suspension element known to one skilled in the art may be used without departing from the principles of the present disclosure.

The interior portion 43 is fluidly connected to a reservoir 45 or accumulator containing a liquid fluid, such as oil, and a compressible gas fluid, such as nitrogen ($N_2$) through a plurality of fluid paths or links 44a to 44c. The reservoir 45 typically acts as a spring in the damping system. The present embodiment uses three fluid paths, however it shall be understood that the number of fluid paths 44a to 44c shall be adapted in relation to the desired granularity in the variation of the damping.

Figure 4A:
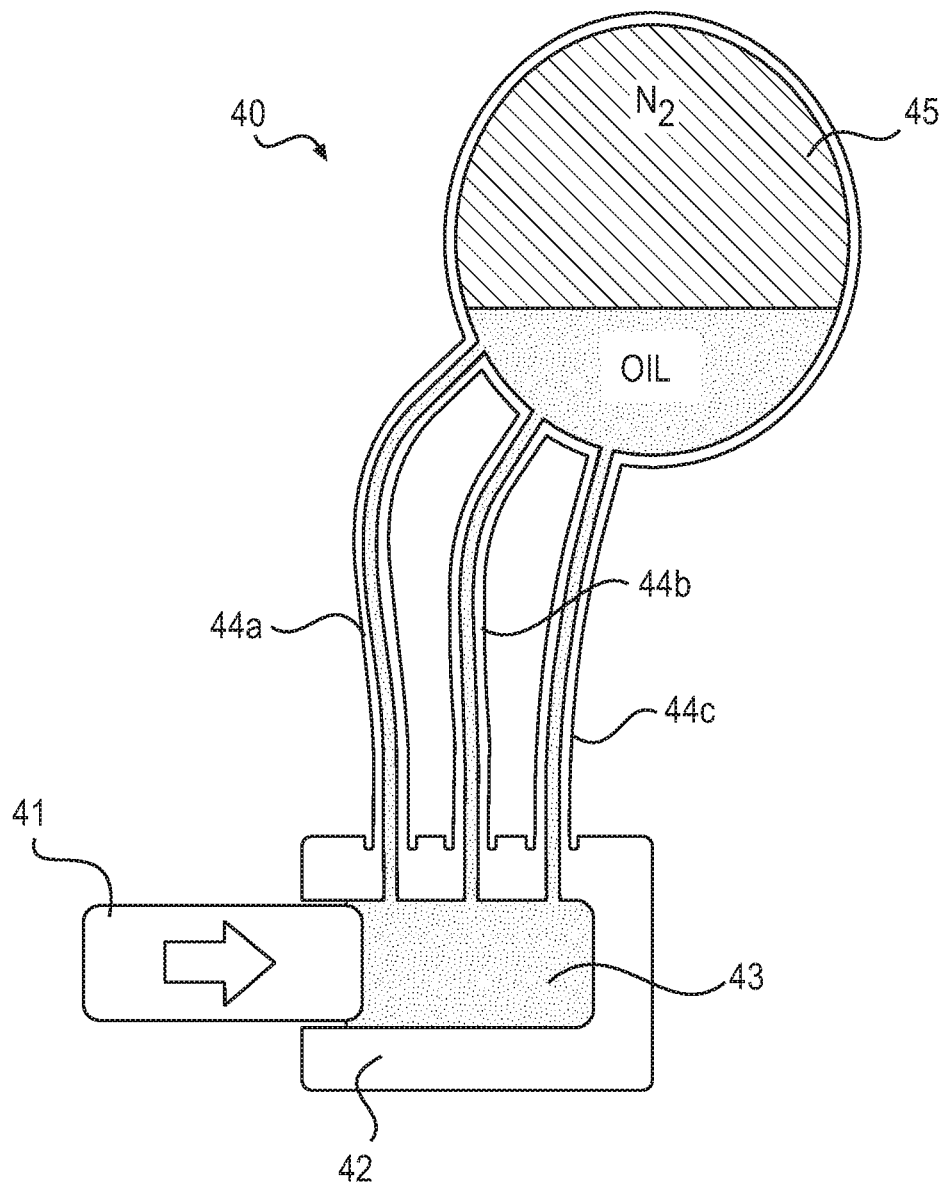
FIGS. 4a to 4d illustrate the different position of a piston or plunger within a cylinder as load is increased on the damping system.

As load is applied to the suspension element of the track system, the plunger 41 moves toward the closed end of the interior portion 43, as shown in FIG. 4A. The displacement of the plunger 41 pushes the liquid fluid up to the reservoir 45 using the three fluid paths 44a to 44c. As a consequence, the damping value remains low as the pressure required to push the plunger 41 is low.

Figure 4B:
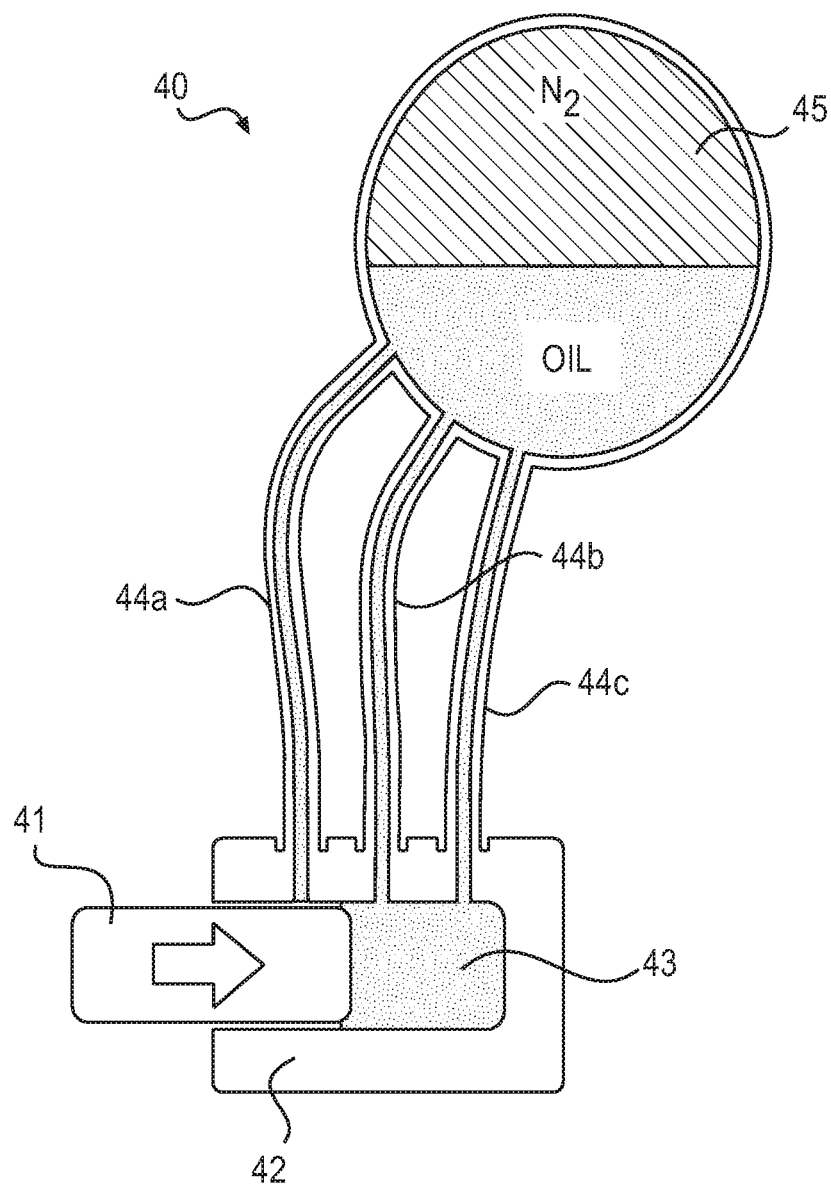

As more load is applied to the suspension, the plunger 41 further moves toward the closed end of the interior portion 43, as shown in FIG. 4B. At this point, the plunger 41 blocks or limits the passage of liquid fluid in the first fluid path 44a. The required pressure to further move the plunger at a given velocity is increased as only two fluid paths remain to push the liquid fluid up to the reservoir 45 and the volume of liquid fluid in the reservoir is increased. As a consequence, the damping value is increased as the pressure required to push the plunger 41 is increased.

Figure 4C:
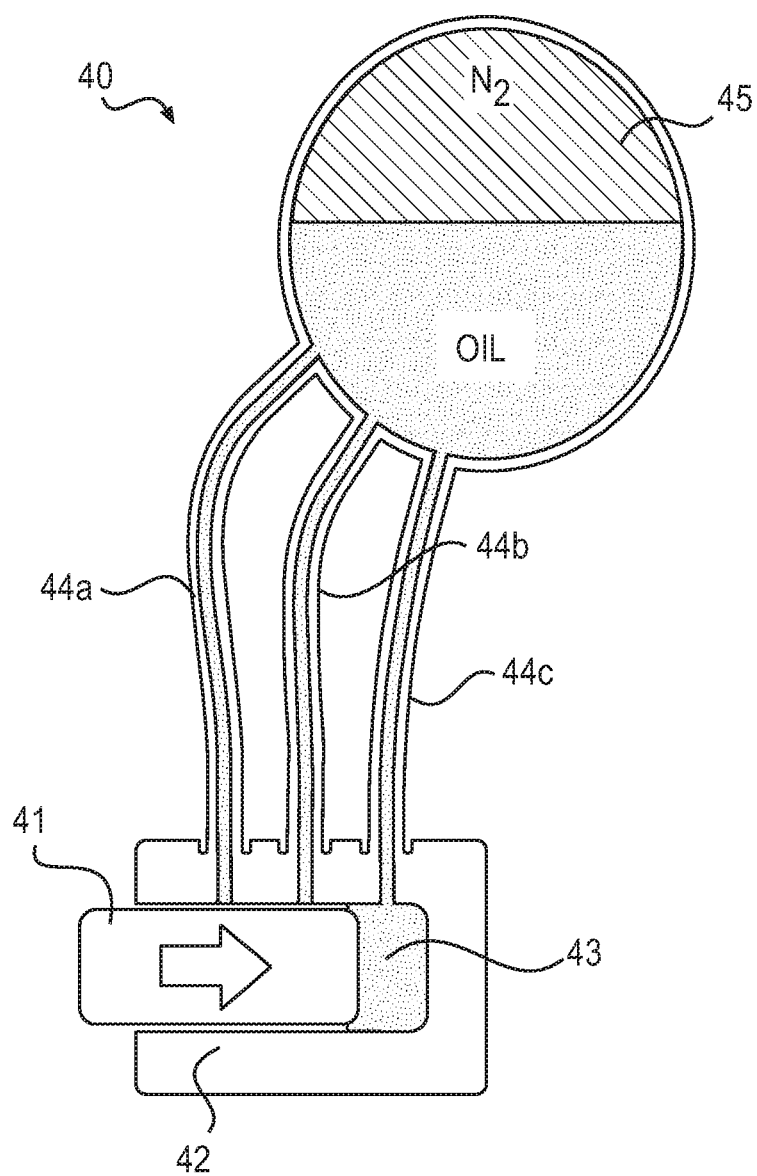

As additional load or force is applied to the suspension, the plunger 41 further moves toward the closed end of the interior portion 43, as shown in FIG. 4C. At this point, the plunger 41 blocks the passage of liquid fluid in the first and second fluid path 44a and 44b. The required pressure to further move the plunger at a given velocity is increased as only one fluid path remains available to push the liquid fluid up to the reservoir 45 and as the volume of liquid fluid in the reservoir is increased. As a consequence, the damping value is further increased as the pressure required to push the plunger 41 is further increased.

Figure 4D:
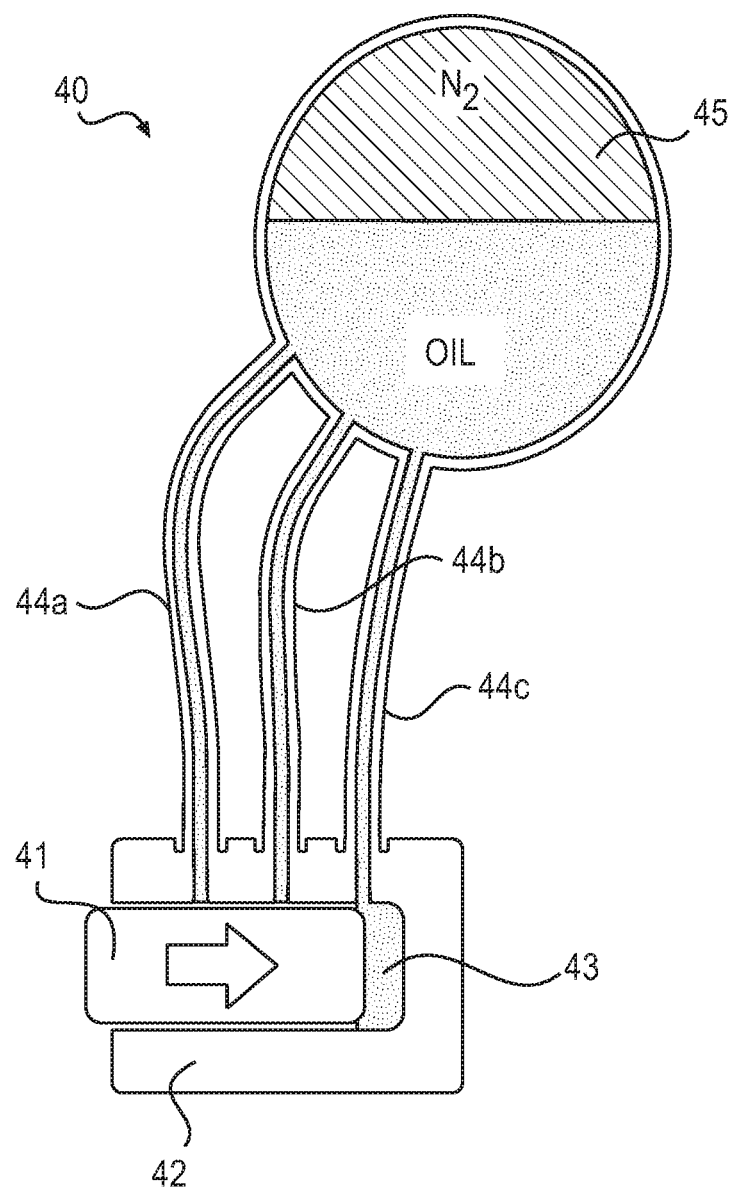

As maximal load or force is applied to the suspension, the plunger 41 further moves toward the closed end of the interior portion 43, as shown in FIG. 4D. At this point, the plunger 41 may partially block the passage of liquid fluid of the third fluid path 44c. The required pressure to further move the plunger is increased to a maximum as limited volume of fluid may be pushed through the third fluid path 4c up to the reservoir 45 and as the volume of liquid fluid in the reservoir is increased. As a consequence, the damping value reaches a maximal value for this configuration as the liquid fluid may not be further compressed and thus the movement of the plunger 41 is nearly stopped.

As the plunger 41 moves towards the closed end of the cylinder 42, the flow of fluid to be pushed in the reservoir 45 is reduced. Referring to an exemplary harvester, as weight is added to the harvester, such as grain, the overall load is increased on the track systems. As a consequence, the damping value of the suspension element 46 is increased to limit oscillation of the track system 1 with regard to the harvester.

In yet another embodiment, the damping system may comprises a double action cylinder (not shown) fluidly connected to a reservoir/accumulator to further vary the damping value. The double action cylinder is configured as fluids applies pressures on both sides of the piston. In a preferred embodiment, the cylinder comprises a least two fluid paths/connectors fluidly connected to the reservoir and may be fluidly connected to each other.

Now referring to FIG. 5, in another embodiment, the damping system 50 may use an active or semi-active system to progressively vary the damping value of the suspension of a track system. In such an embodiment, a plurality of solenoid valves 54a to 54d may be used in conjunction with an electronic controller. In this example, four (4) solenoid valves 54a to 54b are used. However, any number of solenoid valves 54a to 54d could be used to adapt the variation or the granularity of the variation of the damping value.

The solenoid valves 54a to 54d control the flow of fluid going through fluid paths or cable 59. The solenoid valves 54a to 54d may be disposed along the cylinder 52 or be remote with regard to the cylinder 52 of the suspension element 60. In an open position, the solenoid valves 54a to 54d allow liquid fluid to flow up to a reservoir or accumulator 55. In a closed position, the solenoid valves 54a to 54d block liquid fluid to flow up to a reservoir or accumulator 55. In other embodiments, the different solenoid valves could be configured to partially open in order to increase the granularity of the variation of the damping value. Such increase of granularity may be obtained by using low debit valve such as needle valve 58. In a preferred embodiment, at least one solenoid valve 54a to 54d shall remain in an open state, or in a partially open state, to ensure a minimal flow of fluid within the system in order to prevent damages to the suspension system 60.

Still referring to FIG. 5, an interior portion 53 of the cylinder 52 is fluidly connected to the reservoir 55 through a fluid path 59. The reservoir 55 contains a liquid fluid, such as oil, and a compressible gas fluid, such as nitrogen ($N_2$) through a plurality of fluid paths or links 59. The reservoir 45 typically acts as a spring in the damping system.

The position of the plunger 51 is evaluated using any mechanism located within or outside the cylinder 52 to measure the stroke position, such as limit switches, sensors, electrically conductive resins or varnishes or, as shown in FIG. 5, a digital rule 57 integrated or not within the cylinder 52. Such digital rule 57 is known in the art as a linear variable differential transformer (LVDT). As the plunger moves within the cylinder, the stroke position is communicated to a controller 56 configured to send a signal to one or more of the solenoid valves 54a to 54d to be controlled, such as opening or closing the solenoid valves 54a to 54d, in order to control the volume of the fluid path 59 to the reservoir 55. The reduced volume of the fluid path 59 increases the damping value or resistance of the suspension element 46 as the required force for pushing the liquid in the reservoir 55 must be increased at a given velocity of the plunger 51. As the plunger 51 moves toward the closed end and as more solenoid valves 54a to 54d are closed, the damping value is progressively increased as the volume of liquid fluid which may be pushed in the reservoir 55 is limited or reduced.

As more force or load is applied to the suspension, the plunger 51 moves toward the closed end of the cylinder 52. At a desired point, at least one of the solenoid valves 54a to 54d must be opened in order to limit the movement of the plunger only to the minimum compression of the liquid. At this point, the damping value is maximal.

Optionally, needle valves 58 may be added between the solenoid valves 54a to 54d and the reservoir 55 to manually restrict the flow of fluid in the fluid path 59. Such valves 58 may be installed between the reservoir 55 and the solenoid valves 54a to 54d or between the solenoid valves 54a to 54d and the interior chamber 53. Such variation of the fluid flow or debit by needle valves 58 is generally preset or adapted to a specific vehicle or specific conditions of use of a vehicle.

Figure 9:
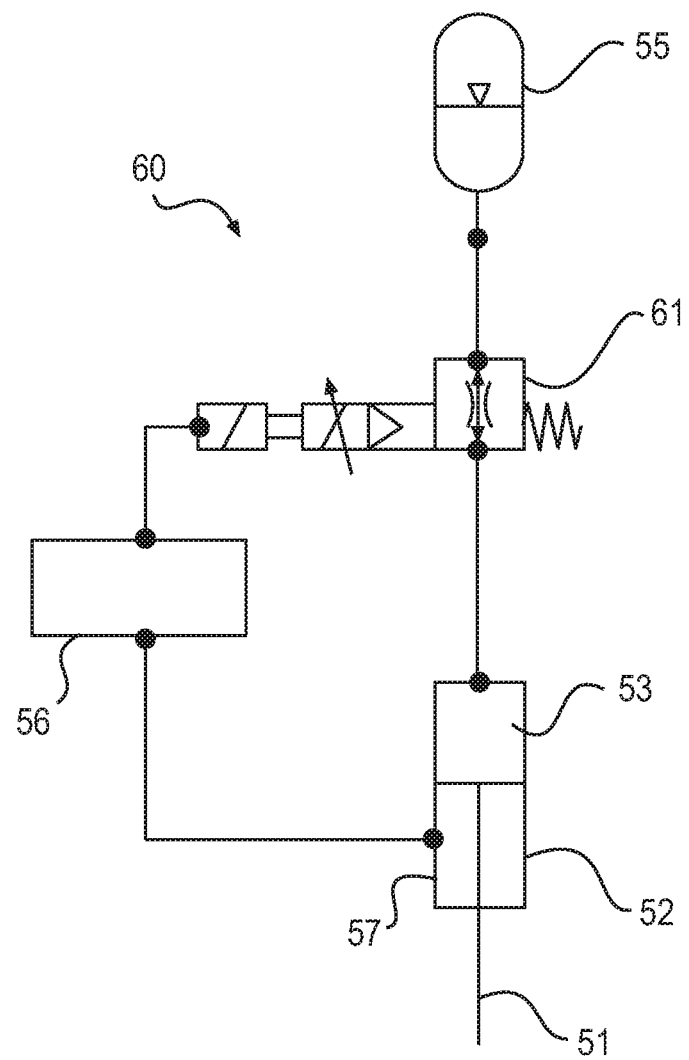
FIG. 9 is an illustration of an embodiment using a proportional valve for varying the damping value of the damping system of a track system.

Now referring to FIG. 9, the fluid circuit of an embodiment of the damping system for a track system using a proportional valve is shown. A LVDT 57 is installed on the cylinder 52 to measure or identify the position of the plunger 51 within the interior cavity 53 of the cylinder 52. The controller 56 is configured to receive a signal from the LVDT 57 indicating the position of the plunger 51 within the cylinder 52. The controller 56 is further configured to send a signal to the proportional valve 61 to let a specific flow of fluid based on the position of the plunger 51. The proportional valve 61 controls the flow of fluid between the interior cavity 53 of the cylinder 52 and the reservoir 55, thus changing the damping value as the plunger 51 moves within the cylinder 52. Understandably, any type of valve or mean which provides infinitely adjustable flow volumes could be used instead of the proportional valve 61 without departing from the principles of the present invention. Such mean to provide infinitely adjustable flow volumes may further comprise any mechanical valve closing/opening with regard to the position of the piston/plunger 51 and/or of the pressure of the compression chamber of the cylinder 52.

The opening/closing of the proportional valve 61 is controlled in order to provide a damping value varying as a function of the position of the plunger 51. In a preferred embodiment, the damping value of the suspension system shall tend to respect the theoretical function as shown in FIG. 3. Understandably, the opening/closing of the proportional valve 61 may be controlled differently based on the direction of the plunger 51 and/or the position of the plunger 51. Thus, in other embodiments, predetermined scenarios could be programmed in the controller in order to dynamically vary the damping value of the suspension system based on the identification of different conditions of the position and/or direction of the plunger.

Figure 10:
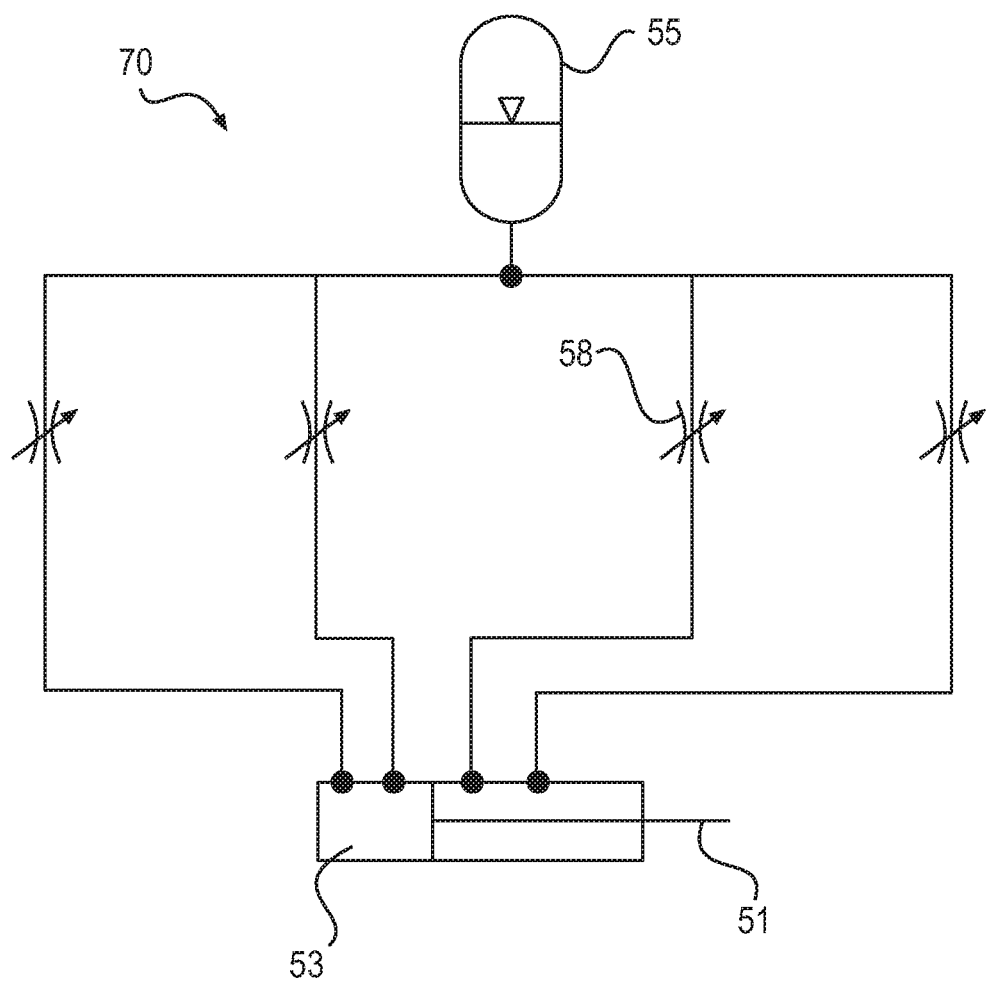
FIG. 10 is a schematic diagram of a damping system having multiple flow path along a hollow portion to vary damping value as load is increased/decreased on the damping system.

Now referring to FIG. 10, the fluid circuit of an embodiment of the damping system 70 for a track system using multiple fluid paths controlled by mean for regulating the flow of fluid within the fluid paths 58 is shown. In such an embodiment, the suspension system 70 comprises a plunger 51 configured to move within the cavity 53 of the cylinder 52. As explained above, different flow paths allow the variation of the damping value of the suspension element 70 by varying the flow of fluid between the cylinder 52 and the reservoir 55 based on the position of the plunger 51. A mean for regulating the flow of the fluid within one or more fluid paths 58 is connected between the cylinder 52 and the reservoir 55. In a preferred embodiment, such mean 58 is embodied as a needle valve. Such mean 58 is configured for specific conditions of operations and aims fine-tuning or configuring the resulting damping value for a specific load.

Figure 6:
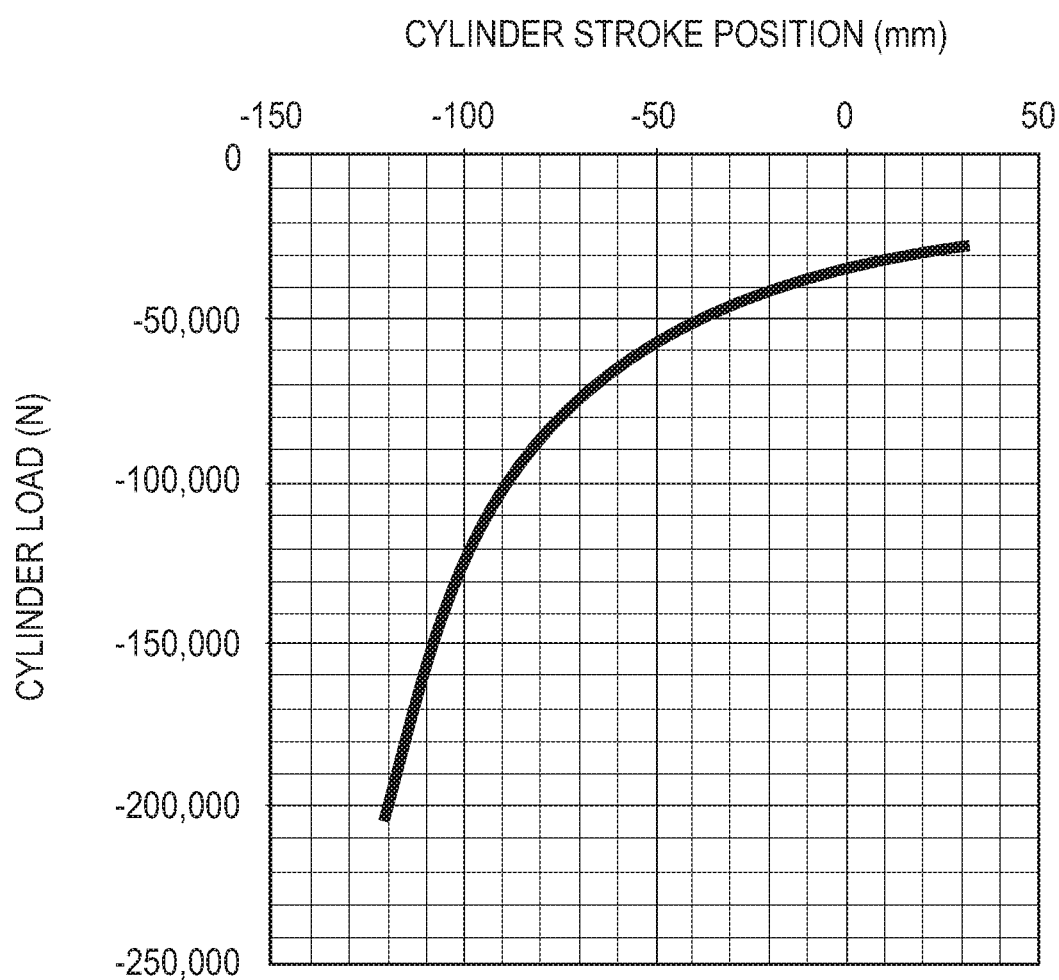
FIG. 6 is an exemplary diagram of cylinder stroke position values in relation to cylinder load for specific conditions and/or specific vehicle.
Figure 7:
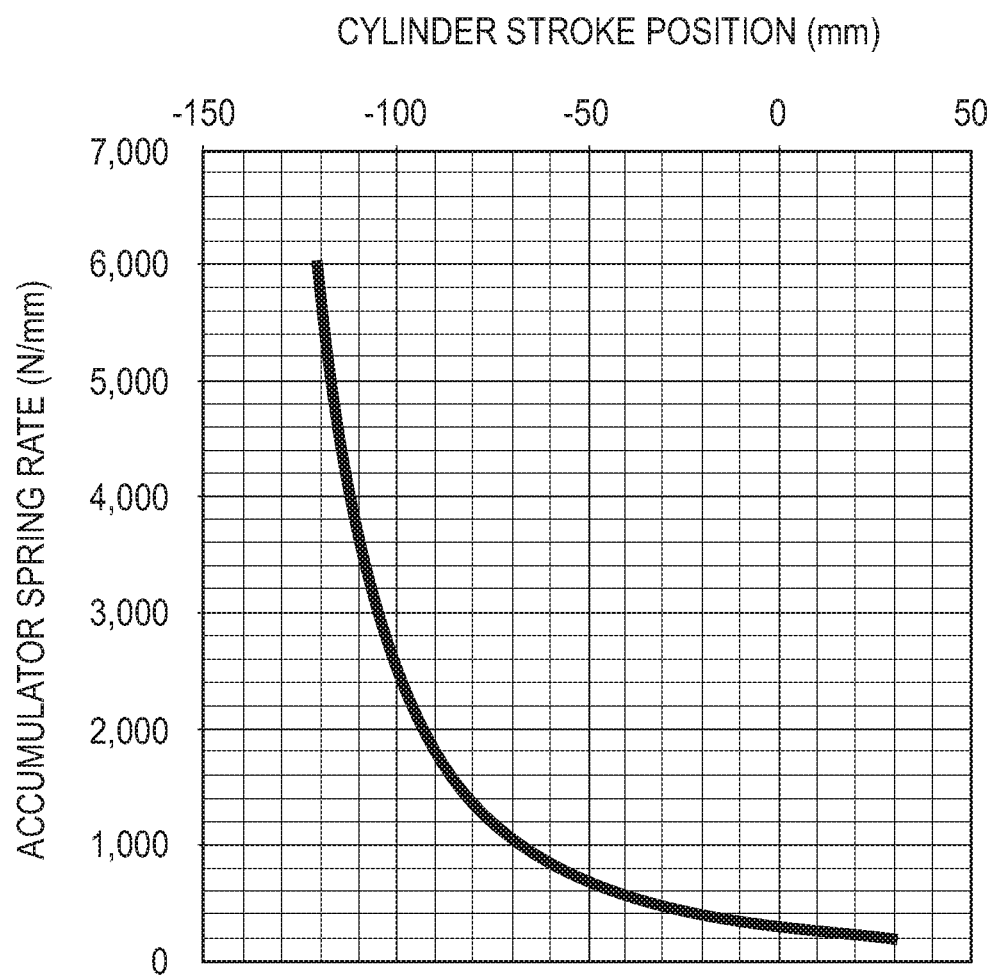
FIG. 7 is an exemplary diagram of cylinder stroke position values in relation to accumulator spring rate for specific conditions and/or specific vehicle.
Figure 8:
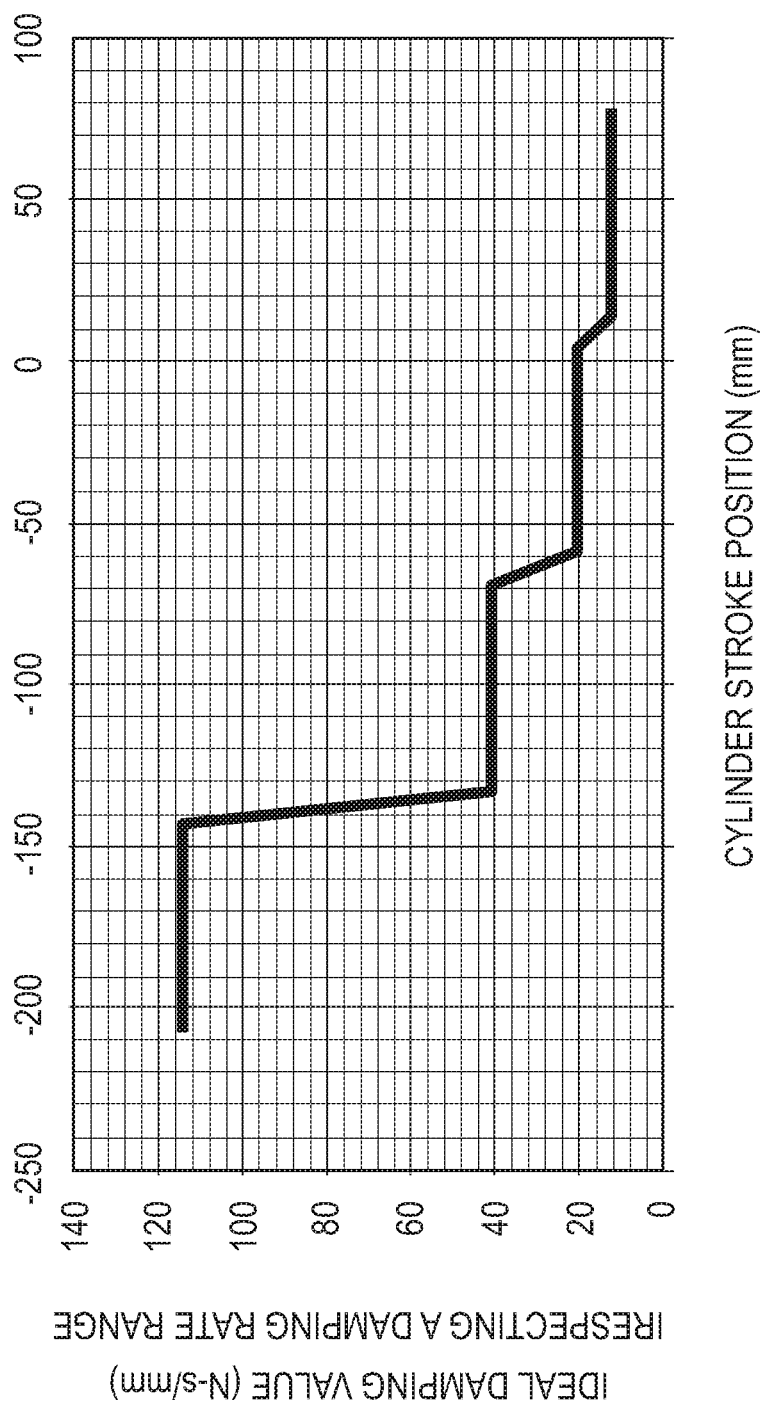
FIG. 8 is a diagram of cylinder stroke position values in relation to ideal damping value respecting a damping rate range.

Now referring back to FIGS. 6 and 7, the graphical representation of the cylinder load as a function of the cylinder stroke position and of the accumulator spring rate as a function of the cylinder stroke position for a specific damping rate are presented. As explained above, the damping rate the damping rate may be optimized by measuring generated vibration based on the specific conditions of operation, the type of vehicle, the profile of the terrain or any other conditions of operation. Accordingly, the stroke position may be changed in order to obtain a specific damping value. Thus, in such embodiment, the damping ratio would be variable as a function of the stroke position but would remain within an acceptable damping ratio range. As an example, the damping ratio may be changed by using more than one oil reservoir configured to store the oil exiting the damper system cylinder. The debit to such oil reservoirs may be controlled by valves or any other system allowing the closing and opening of the oil reservoir. Furthermore, the status (open or close) of the valves shall be configured to depend on the cylinder 22 stroke position (see FIG. 8 for the typical damping ratio values as a function of the cylinder stroke position of such an embodiment).

Understandably, the variable damping system for a track system may function on a variety of different track system as long as suspension elements are used to reduce vibration and to increase traction efficiency of the track. As such, the variable damping system for a track system could be installed on a split frame track system as shown in FIGS. 1 to 2 but could be adapted to be installed on other frame designs, such as the design disclosed in the U.S. Pat. No. 5,452,949 may be used. Other embodiments could also be configured for various frame assemblies without departing from the principles of the present invention.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method for varying the damping value of a damping system of a track system having a multi-member frame assembly including a first frame member and a second frame member, the first frame member being movable with respect to the second frame member, the damping system including:
a damper operatively connected between the first and second frame members of the track system for damping relative movement between the first and second frame members, the damper including:
a cylinder having a length and a cylindrical sidewall extending along the length of the cylinder; and
a piston that is reciprocally movable within the cylinder between an extended position and a retracted position, the piston sealingly engaging the cylinder for forming a variable volume chamber containing a liquid, the piston being movable between the extended position and the retracted position in a plurality of intermediate positions by changing a volume of the liquid contained within the chamber of the cylinder;
a reservoir fluidly connected to the chamber of the cylinder of the damper, the reservoir simultaneously containing the liquid and a gas; and
a plurality of conduits fluidly connecting the damper to the reservoir, each of the conduits being fluidly connected to the reservoir for allowing the liquid to flow between the chamber of the cylinder and the reservoir to change the volume of liquid within the chamber of the cylinder to move the piston within the chamber of the cylinder, the gas in the reservoir being under pressure and applying hydrostatic pressure to the liquid, tending towards an increase in the volume of liquid within the chamber of the cylinder, biasing the piston toward the extended position, the plurality of conduits being fluidly connected to the longitudinal sidewall of the cylinder and being spaced-apart from one another along the length of the cylinder;
the method comprising varying the liquid flow between the chamber of the cylinder and the reservoir in relation to movement of the piston within the chamber of the cylinder such that:
when the piston is in the extended position, the liquid flow between the chamber of the cylinder and the reservoir is permitted by all of the plurality of conduits and the damping system has a first predetermined damping value;
when the piston is in one of the plurality of intermediate positions, the liquid flow between the chamber of the cylinder and the reservoir is permitted by one or more of the plurality of conduits and the damping system has a second predetermined damping value; and
when the piston is in the retracted position, the liquid flow between the chamber of the cylinder and the reservoir is permitted by one of the plurality of conduits and the damping system has a third predetermined damping value.

2. The method as claimed in claim 1, the method further comprising:
measuring the position of the piston in relation to the length of the cylinder; and
modifying the liquid flow based on the measured position of the piston.

3. The method as claimed in claim 2, the method further comprising communicating a control signal to an active fluid flow control means configured to vary the liquid flow based on the control signal.

4. The method as claimed in claim 3, the method further comprising communicating the measured position to a controller configured to communicate the control signal to the active fluid flow control means.

5. The method as claimed in claim 3, wherein the active fluid flow control means is one or more solenoid valves, the method further comprising controlling the one or more solenoid valves to vary the liquid flow between the chamber of the cylinder and the reservoir.

6. A method for varying the damping value of a damping system of a track system having a multi-member frame assembly including a first frame member and a second frame member, the first frame member being movable with respect to the second frame member, the damping system comprising:
a damper operatively connected between the first and second frame members of the track system for damping relative movement between the first and second frame members, the damper including:
a cylinder; and
a piston that is reciprocally movable within the cylinder between an extended position and a retracted position, the piston sealingly engaging the cylinder for forming a variable volume chamber containing a liquid, the piston being movable between the extended position and the retracted position in a plurality of intermediate positions by changing a volume of the liquid contained within the chamber of the cylinder;

a reservoir fluidly connected to the chamber of the cylinder of the damper, the reservoir simultaneously containing the liquid and a gas;

at least one conduit fluidly connecting the damper to the reservoir for allowing the liquid to flow between the chamber of the cylinder and the reservoir to change the volume of liquid within the chamber of the cylinder to move the piston within the chamber of the cylinder, the gas in the reservoir being under pressure and applying hydrostatic pressure to the liquid, tending towards an increase in the volume of liquid within the chamber of the cylinder, biasing the piston toward the extended position; and at least one valve disposed along the at least one conduit for controlling the flow of the liquid between the chamber of the cylinder and the reservoir, the at least one valve being movable between:

an open position in which the liquid is permitted to flow between the chamber of the cylinder and the reservoir, rendering the piston movable within the chamber for allowing relative movement between the first and second frame members; and a closed position in which the liquid is prevented from flowing between the chamber of the cylinder and the reservoir, rendering the piston effectively immovable within the chamber for effectively preventing relative movement between the first and second frame members;

the at least one valve being movable between the open and closed positions in a plurality of intermediate positions so as to provide a plurality of flow rates of the liquid within the at least one conduit, rendering the piston movable between the retracted position and the extended position within the chamber of the cylinder at different speeds;

the method comprising varying the liquid flow between the chamber of the cylinder and the reservoir in relation to movement of the piston within the chamber of the cylinder such that:

when the at least one valve is in the open position, the damping system has a first predetermined damping value; and when the at least one valve is in one of the plurality of intermediate positions, the damping system has a second predetermined damping value.

7. The method as claimed in claim 6, the method further comprising:

measuring the position of the piston in relation to a length of the chamber of the cylinder; and modifying the liquid flow based on the measured position of the piston.

8. The method as claimed in claim 7, the method further comprising communicating the measured position to a controller configured to communicate with the at least one valve.

* * * * *